United States Patent
Justin

(10) Patent No.: US 11,822,738 B2
(45) Date of Patent: Nov. 21, 2023

(54) INFORMATION HANDLING SYSTEM MOUSE WITH PUSH BUTTON SCROLL

(71) Applicant: Dell Products L.P., Round Rock, TX (US)

(72) Inventor: Wong Hin Loong Justin, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/726,685

(22) Filed: Apr. 22, 2022

(65) Prior Publication Data
US 2023/0341955 A1    Oct. 26, 2023

(51) Int. Cl.
G06F 3/0362    (2013.01)
G06F 3/0354    (2013.01)

(52) U.S. Cl.
CPC ........ G06F 3/0362 (2013.01); G06F 3/03543 (2013.01)

(58) Field of Classification Search
CPC .......................... G06F 3/0362; G06F 3/03543
See application file for complete search history.

(56) References Cited

U.S. PATENT DOCUMENTS

| | | | |
|---|---|---|---|
| 6,154,201 A | 11/2000 | Levin et al. | |
| 6,697,827 B1 | 2/2004 | D'Agosto, III | |
| 7,532,200 B2 | 5/2009 | Chu | |
| 9,989,945 B2 | 6/2018 | Adler | |
| 2002/0084986 A1 | 7/2002 | Armstrong | |
| 2002/0101404 A1 | 8/2002 | Tichy et al. | |
| 2003/0025673 A1 | 2/2003 | Ledbetter et al. | |
| 2004/0041787 A1 | 3/2004 | Graves | |
| 2005/0259070 A1 | 11/2005 | Hull et al. | |
| 2005/0259077 A1 | 11/2005 | Adams et al. | |
| 2006/0007151 A1 | 1/2006 | Ram | |
| 2006/0033703 A1 | 2/2006 | Olien et al. | |
| 2009/0231271 A1 | 9/2009 | Heubel et al. | |
| 2010/0214219 A1 | 8/2010 | Cheng | |
| 2011/0157052 A1 | 6/2011 | Lee et al. | |
| 2011/0270358 A1 | 11/2011 | Davis et al. | |
| 2013/0306395 A1 | 11/2013 | Frazier et al. | |
| 2017/0262080 A1* | 9/2017 | Armstrong ............ | G06F 3/0346 |
| 2017/0285848 A1 | 10/2017 | Rosenberg et al. | |
| 2019/0025947 A1* | 1/2019 | Wei ........................ | G06F 3/0383 |

(Continued)

OTHER PUBLICATIONS

Playstation, "DualSense Wireless Controller," downloaded from https://www.playstation.com/en-us/accessories/dualsense-wireless-controller/ on Dec. 8, 2022, 9 pages.

(Continued)

*Primary Examiner* — Hang Lin
(74) *Attorney, Agent, or Firm* — ZAGORIN CAVE LLP; Robert W. Holland

(57) ABSTRACT

An information handling system mouse couples a precision scroll button located proximate a scroll wheel of the mouse upper surface to a multidirectional switch, such as a five-way switch, so that movement of the precision scroll button commands through the five-way switch a scroll up or down at a speed defined by the end user and independent of the scroll wheel speed. For instance, a fast scroll at different scroll rates is commanded by actuating the five-way switch forward or backwards.

17 Claims, 5 Drawing Sheets

(56) References Cited

U.S. PATENT DOCUMENTS

2020/0310611 A1    10/2020   Vincent et al.
2021/0038334 A1     2/2021   Hsu et al.

OTHER PUBLICATIONS

Logitech, "MX Master 3S," downloaded from https://www.logitech.com/en-us/products/mice/mx-master-3s.910-006556.html on Dec. 8, 2022, 11 pages.

Asus, "ROG Chakram X," downloaded from https://rog.asus.com/mice-mouse-pads/mice/ergonomic-right-handed/rog-chakram-x-model/ on Dec. 8, 2022, 14 pages.

* cited by examiner

INFORMATION HANDLING SYSTEM MOUSE WITH PUSH BUTTON SCROLL

BACKGROUND OF THE INVENTION

Field of the Invention

The present invention relates in general to the field of information handling system peripheral devices, and more particularly to an information handling system mouse with push button scroll.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components that execute instructions to process information and typically present the information as visual image content at a display, such as an integrated display in a portable system or a peripheral display in portable and desktop systems. Generally, end users interact with the visual image content through peripheral devices, such as a keyboard or a mouse. The mouse has become a ubiquitous tool because it provides an intuitive interface with visual content. A mouse typically includes a position sensor, such as an optical sensor, that reports changes of position to an information handling system, which applies the changes in position by moving a cursor on the display. The mouse typically has buttons to "click" as inputs based upon the cursor position, such as for selecting information associated with an image at the cursor or grabbing part of the image to move to another part of the display. In addition, a mouse typically includes a scroll wheel exposed at an upper surface and accessible to an end user finger when the end user hand rests on the mouse. The scroll wheel generally has a circular shape and rotates in response to a push by an end user finger. As the scroll wheel rotates, a scroll command is sent to the information handling system to move the visual image content up or down based upon the direction of the scroll wheel rotation.

One difficulty with the scroll wheel is that it typically moves visual image content at a set rate, such as to allow an end user to read a web page by scrolling through the content. When an end user wants to scroll at a more rapid rate, the scroll wheel generally must be rotated aggressively to obtains sufficient speed. Typically, the finger position on the upper surface of the mouse makes repeated rotations of the scroll wheel difficult to accomplish. Some scroll wheels include a switch that allows an end user to adjust the amount of scroll that is accomplished for each rotation, such as by changing selection of gears within the mouse. These scroll wheels tend to be inconvenient to operate and require the end user to change the setting manually when changes to scroll rate are desired. Further the various gear assemblies tend to be complex, which makes them more expensive to manufacture and more likely to break. The scroll wheel position is typically read by an optical sensor within the mouse, which is subject to noise and can be less precise.

SUMMARY OF THE INVENTION

Therefore, a need has arisen for a system and method which provides a robust and flexible scroll interface.

In accordance with the present invention, a system and method are provided which substantially reduce the disadvantages and problems associated with previous methods and systems for including a scroll interface at a mouse upper surface. A multi-directional switch disposed in a mouse and coupled to a member that extends from the upper surface of the mouse accepts scroll input presses that translate into scroll commands by switch actuations. The scroll switch actuation offers user preference scroll responses as a supplement to scroll wheel inputs made at an adjacent scroll wheel of the mouse.

More specifically, an information handling system processes information with a processor and memory that cooperate to execute instructions and present the information as visual image content at a display. A mouse with an optical position sensor in a mouse body reports movement to control a cursor presented at the display. A scroll wheel exposed at an upper side of the mouse body accepts scroll inputs to command a scroll of visual images at a display, such as by rotation to command a scroll up or down. A precision scroll button is disposed proximate the scroll wheel to command various scroll responses, such as an incremental scroll movement, a page scroll or a fast scroll. For instance, the scroll response may be set in a user interface of the information handling system that manages peripheral devices or controlled by simultaneous inputs at the multidirectional switch.

The present invention provides a number of important technical advantages. One example of an important technical advantage is that a precision scroll button has a robust and flexible response to provide end user scroll inputs at a mouse independent of and as a supplement to a scroll wheel. In one embodiment, the multidirectional switch is a five-way switch that offers precision scroll inputs measured by switch actuations for a user configurable scroll input and response. The scroll command is accomplished with a slight finger press forward or backward and offers a variable fast scroll option as a primary response with a finger press and hold or by simultaneous actuation of multiple switch inputs, such as a press down while pressing forward or backward. The scroll input has less finger travel than a conventional scroll wheel and wears the multi-directional switch less while also having a smaller footprint and more reliable hardware. The scroll command results from a digital and binary event that is more precise and operates with less noise for precise and repeatable usage patterns.

BRIEF DESCRIPTION OF THE DRAWINGS

The present invention may be better understood, and its numerous objects, features and advantages made apparent to FIG. 1 depicts a block diagram of an information handling system interfaced with a mouse having a scroll wheel and precision scroll button.

DETAILED DESCRIPTION

An information handling system mouse exposes a precision scroll button at an upper surface that translates end user presses to a multidirectional switch to command scroll inputs that supplement a conventional scroll wheel with a fast or precision scroll command. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
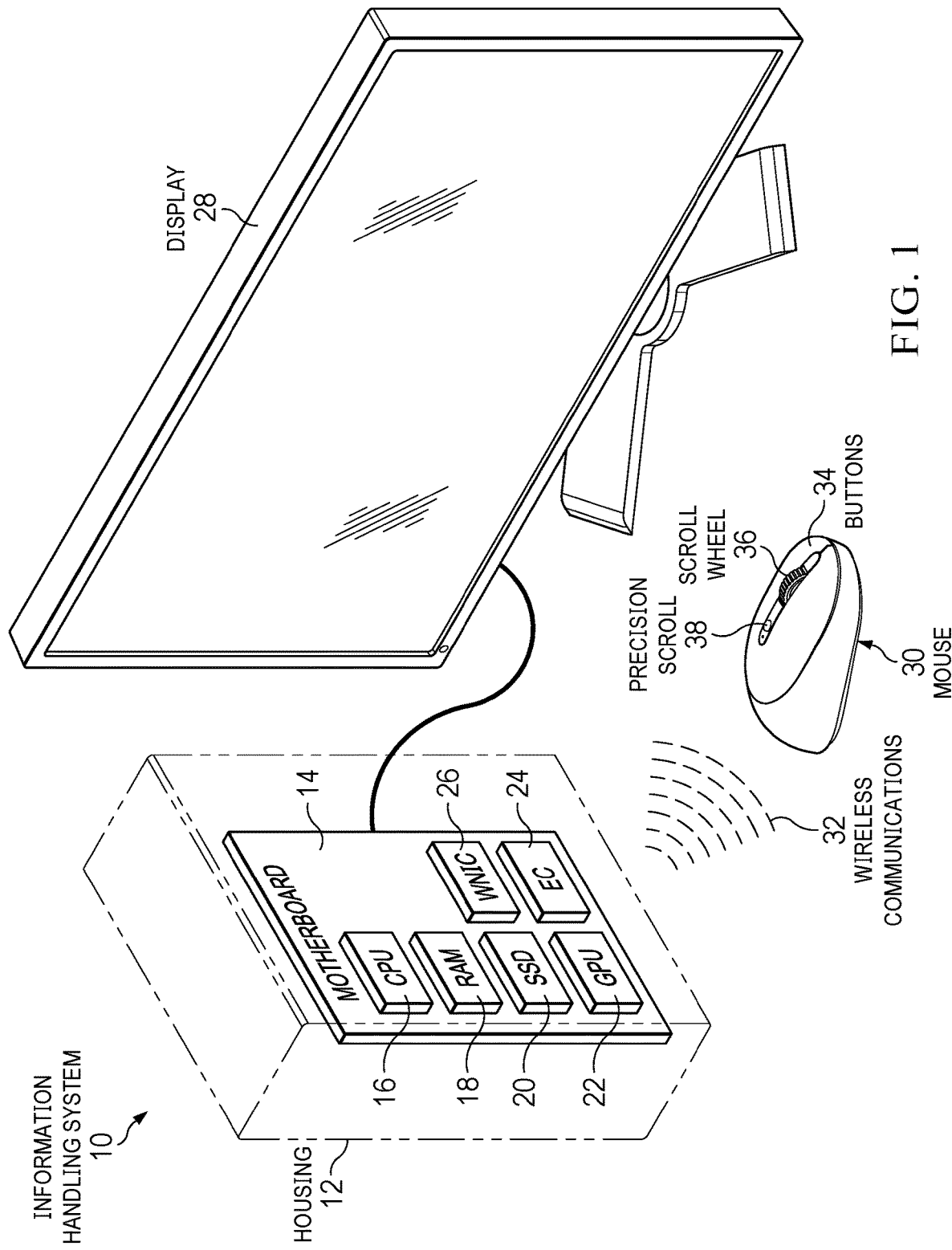

Referring now to FIG. 1, a block diagram depicts an information handling system 10 interfaced with a mouse 30 having a scroll wheel 36 and precision scroll button 38. Information handling system 10 has processing components disposed in a housing 12 couple to a motherboard 14 that cooperate to process information. In the example embodiment, a central processing unit (CPU) 16 executes instruction to process information in cooperation with a random access memory (RAM) 18 that stores the instructions and information. A solid state drive (SSD) 20 provides persistent storage, such as of an operating system and applications that execute on CPU 16 to support end user interactions with peripheral devices. A graphics processing unit (GPU) 22 further processes the information to define visual images for presentation at a display 28. An embedded controller 24 manages operations of the processing components at a physical level, such as application of power and interactions with peripheral input devices like a keyboard and mouse. A wireless network interface controller (WNIC) 26 supports wireless communication with external devices, such as a WiFi network and Bluetooth peripheral devices.

During execution of an operating system and applications, information handling system 10 presents a user interface at display 28 that an end user interacts with using a mouse 30. For example, mouse 30 includes a position sensor, such as an optical sensor, that tracks movement of the mouse on a desktop surface and translates the movement to a cursor presented on display 28 in cooperation with the operating system. For example, the movements are reported by a wireless communication signal 32 to WNIC 26 and through embedded controller 24 to CPU 16. Buttons 34 at a front side of mouse 30 accepts end user inputs known as mouse clicks that typically include a right, center and left buttons associated respectively with left, center and right mouse clicks. In addition, a scroll wheel 36 exposed at a scroll wheel position in the upper surface of mouse 30 accepts scroll inputs that move the visual contents presented at display 28 up and down based upon a forward or rearward rotation movement at scroll wheel 36. In a conventional scroll wheel, a wheel rotates next to a sensor in the mouse that reports the rotation to information handling system 10 to command up or down scroll based upon the rotation direction. In an alternative embodiment, a haptic scroll wheel may be used instead, as described in U.S. patent application Ser. No. 17/726,679, entitled "Information Handling System Mouse with Haptic Scroll" by inventors Krishnakumar, Law and Wong, which is incorporated herein as if fully set forth.

In addition to the scroll wheel, a separate precision scroll button 38 accepts precision scroll commands that move visual content in a user prescribed manner, such as a fast scroll, an ultra-fast scroll, precise scroll increments or page up and down increments. In the example embodiment, precision scroll button 38 is placed to a rear side of the scroll wheel to command scroll in a more precise manner, such as by having an end user use a scroll finger to actuate the button with a reach behind the scroll wheel and a forward or rearward push on the button. Precision scroll button 38 includes a multidirectional switch interfaced with an exposed member held in place in a slightly elevated exposed position at the upper surface of mouse 30. The function performed in response to a press to the multidirectional switch may be defined by end user preferences managed at an information handling system. When no preference is selected, mouse 30 may simply communicate a fast scroll up or down in response to a button press forward or backward as if the scroll wheel received an input with an increased rotation speed. For example, a scroll command at the push button might default to three times the scroll rate of the scroll wheel. In an alternative embodiment described in greater detail below the multidirectional switch may include a down press that may be used to indicate an additional function, such as an ultrafast scroll. In one embodiment, precision scroll button 38 may be used with a conventional scroll wheel to supplement conventional rotational scroll inputs, such as applying a scroll speed proportional to that of a setting applied to the scroll wheel, such as three times whatever scroll rate is commanded by the scroll wheel.

Figure 2:
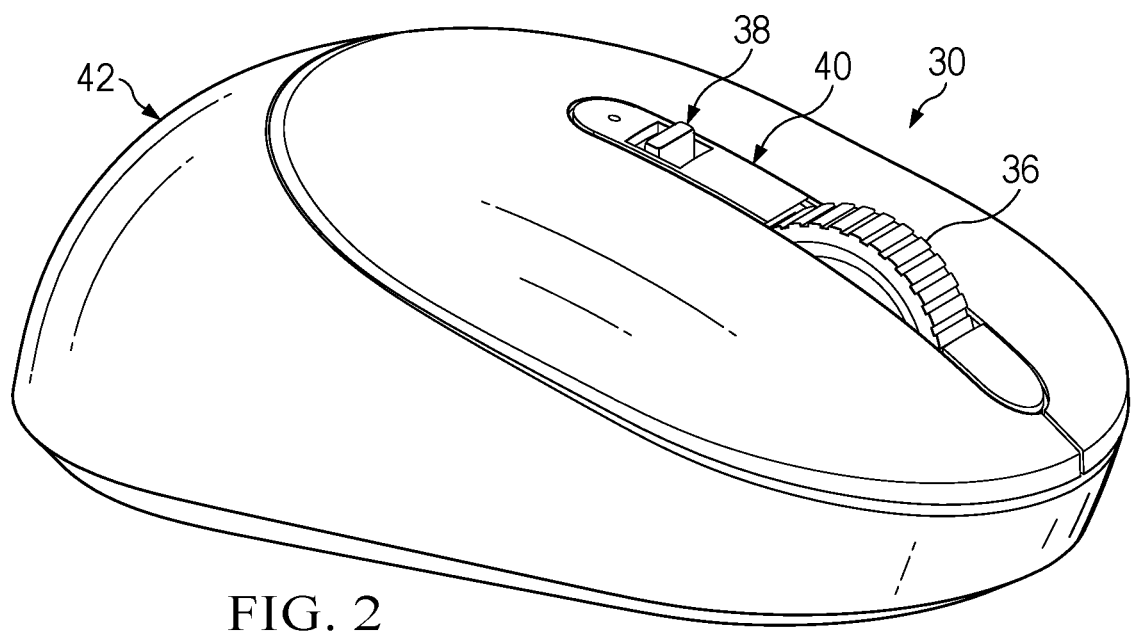
FIG. 2 depicts a side perspective view of the mouse with a scroll wheel and a precision scroll button supported by a five-position switch to command scrolls as a supplement to the scroll wheel.
Figure 3:
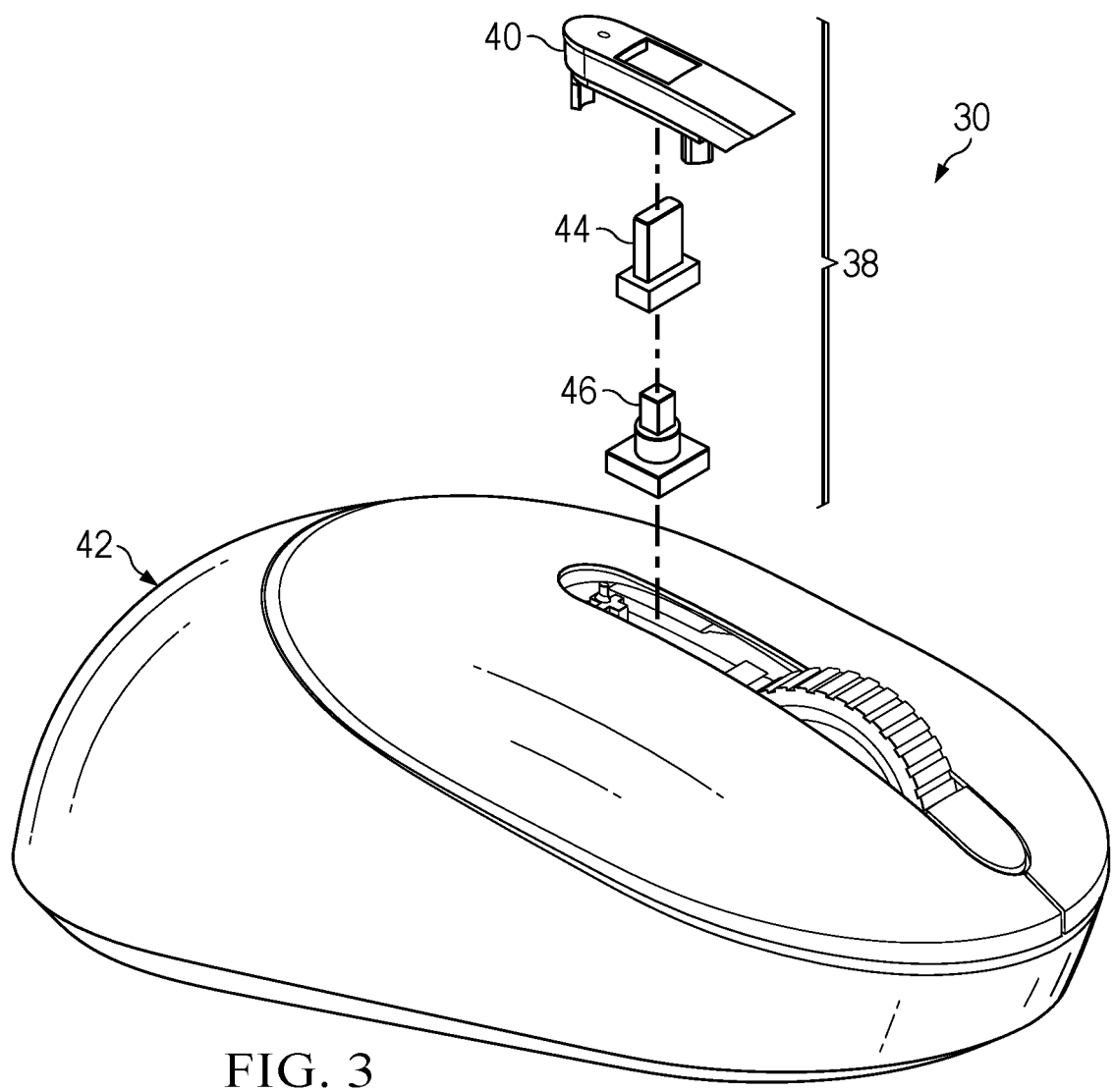
FIG. 3 depicts an exploded view of the precision scroll button.

FIG. 2 depicts a side perspective view of mouse 30 with a scroll wheel 36 and a precision scroll button 38 supported by a multidirectional switch, specifically in the example a five-position switch, disposed in the mouse body 42 interior to command scrolls as a supplement to the scroll wheel. The position of precision scroll button 38 to the rear side of scroll wheel 36 allows an end user finger to reach behind the scroll wheel and push forward or backwards at precision scroll button 38 to command a scroll independent of the scroll wheel. FIG. 3 depicts an exploded view of the precision scroll button. An island bracket 40 having an opening through which a member 44 interfaces with the multidirectional switch 46 to translate end user forward and rearward presses. In the example embodiment, multidirectional switch 46 is a five-way switch that includes a push down way that provides a fast scroll option, such as with simultaneous press down and push forward or rear of the switch. In the example embodiment, only three of the five-ways of the switch may be actuated, specifically the forward, rearward and downward ways. The left and right ways of the five-way switch are constrained from actuation by island bracket 40. The function provided by precision scroll button 38 may be programmed from the information handling system, such as by selecting small increments of scroll per input, page scroll per increment or a fast scroll. In one embodiment, a five-way switch is used with the motions of the switch constrained to forward, rearward and downward presses by island bridge 40. Use of a five-way switch can help to reduce production complexity and inventory where the five-way switch is also used for the scroll wheel or other devices, such as a joystick product. One advantage of the precision scroll button implementation is to provide increased flexibility for managing scroll inputs where the scroll wheel is of a conventional rotating type. In alternative embodiments, a two-way switch may be used with just forward and rearward actuations, or a three way switch may be used with just forward, rearward and downward actuations.

Figure 4:
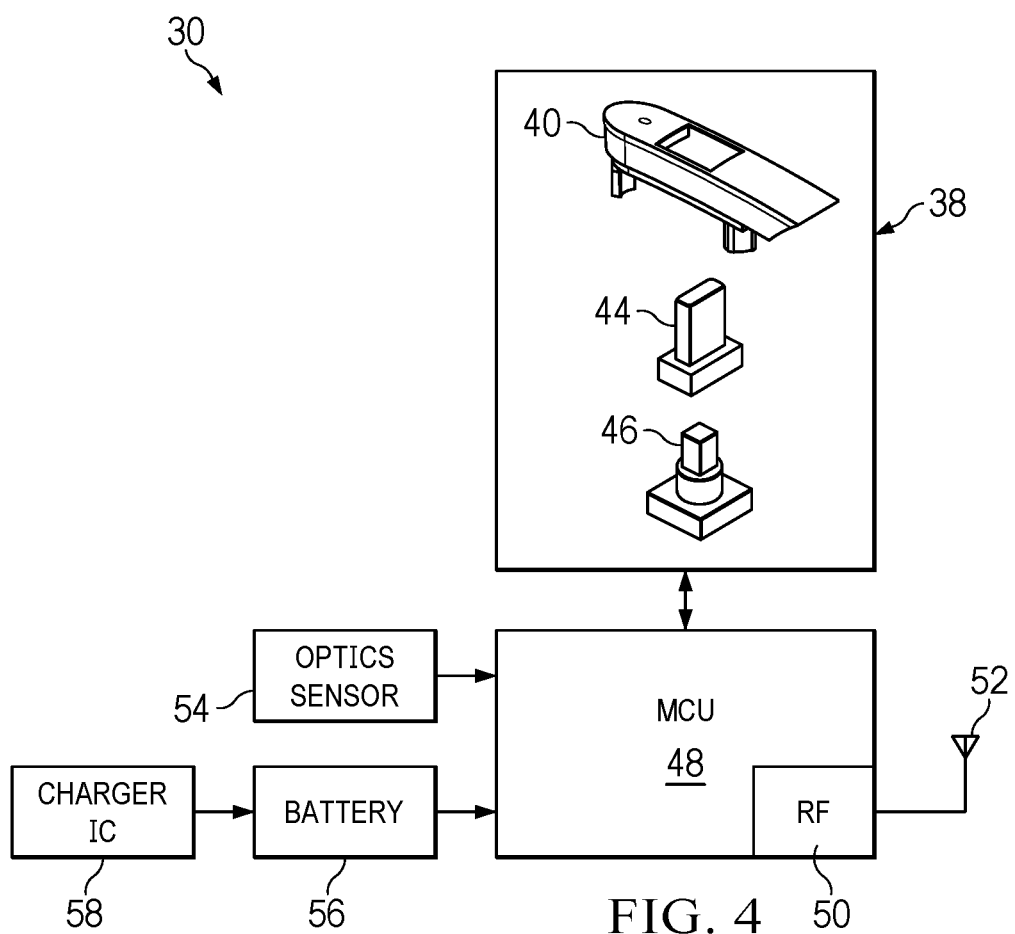
FIG. 4 depicts a block diagram of mouse logical elements to support a precision scroll button.

Referring now to FIG. 4, a block diagram depicts mouse logical elements to support a precision scroll button 38. In the example embodiment, mouse 30 receives end user scroll button inputs by presses at member 44 extending through island bracket 40 to actuate multidirectional switch 46. Multidirectional switch 46 communicates actuations to an MCU 48 or similar processing resource to communicate the input to an information handling system through wireless signals of a radio 50 and antenna 52, such as with Bluetooth signals. Mouse 30 detects changes in the mouse position on a desktop surface with an optical sensor 54 or similar sensor. A battery 56 provides charge to power mouse 30 with a charge of battery 56 managed by a charger integrated circuit 58. Although the example embodiment uses a five-way switch, alternative embodiments may use a variety of switches that accept inputs at different directions similar to a joystick. In one embodiment, a two way switch is used to support scroll up and down. In another embodiment, a three way switch supports scroll up and down with forward and rearward actuation and fast scroll when a downward push is included with a forward or rearward push. In one embodiment, MCU 48 communicates to an information handling system the inputs detected at five-way switch for interpretation at the information handling system. Alternatively, MCU 48 may be programmed by an information handling system based upon end user preferences to provide user-preferred responses to inputs. In one alternative embodiment, inputs at the multidirectional switch may be confirmed with haptic feedback by a haptic device in the mouse body.

Figure 5:
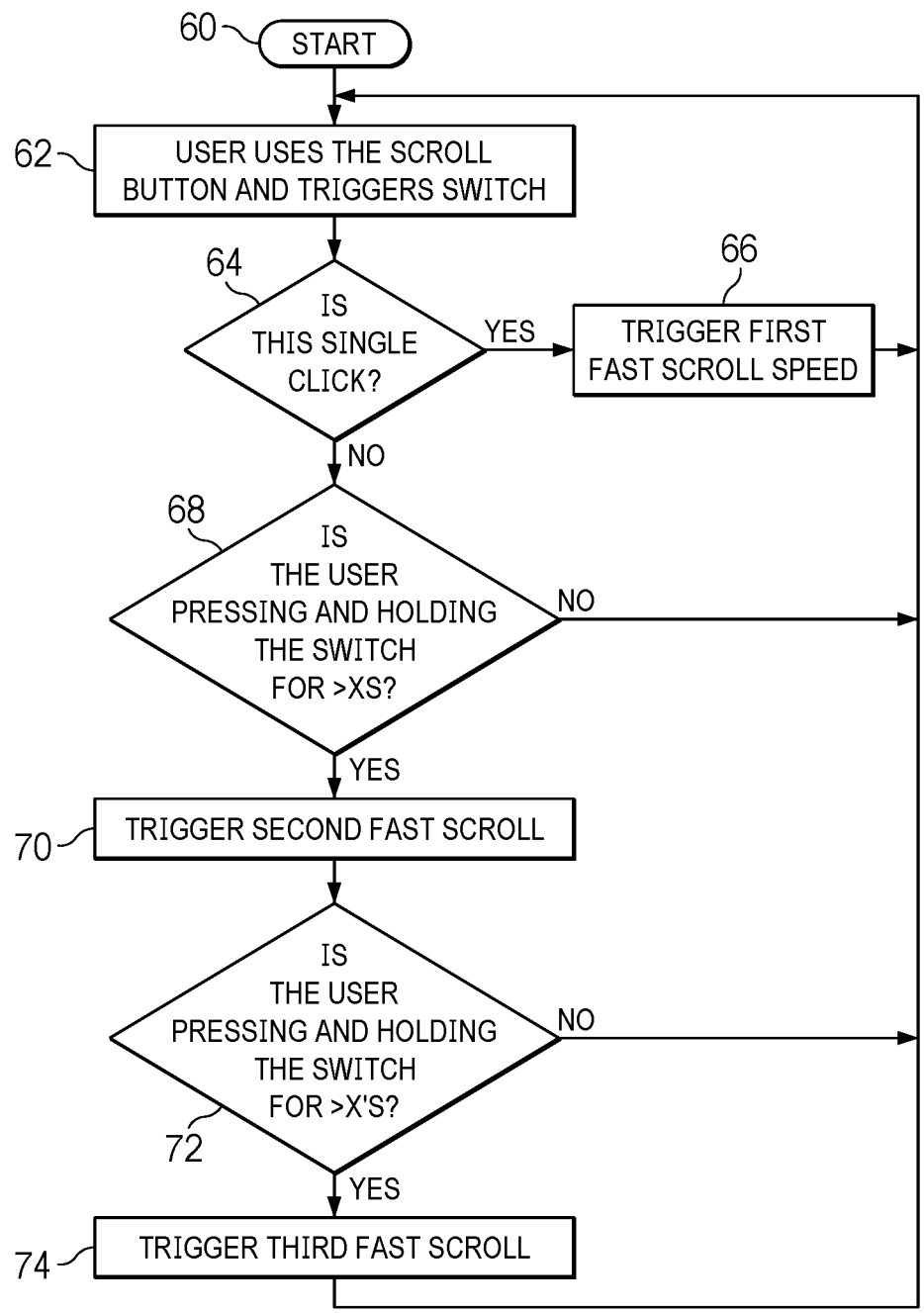
FIG. 5 depicts a flow diagram of a process for applying precision scroll button inputs.

Referring now to FIGS. 5, a flow diagram depicts a process for applying precision scroll button inputs. The process starts at step 60 and at step 62 the end user performs an input at the scroll button that actuates at least one way of the five-way switch. At step 64 a determination is made of whether the actuation is a single click input with just one way of the five-way switch actuated. If yes, the process continues to step 66 to command a first fast scroll speed associated with the actuation, such as an equivalent to a single rotation movement at a conventional scroll wheel. If at step 68 multiple click inputs or multiple actuated ways of the 5-way switch are actuated, the process continues to step to determine the type of input. In the example embodiment, a determination of multiple inputs is made if the scroll button input is held greater than a defined time period. If not, the process returns to step 62 to apply a single click input. If yes, the process continues to step 70 to command a second fast scroll. At step 70 the process continues to step 72 to determine if the way actuation remains held for another predefined time. If not the process returns to step 62. If yes, the process initiates an ultra fast scroll at a third scroll. Although the process of FIG. 5 provides fast and ultra fast scroll based upon an amount of time that the scroll is commanded, in an alternative embodiment fast scroll may be commanded by simultaneous downward way input press with a forward or rearward press.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions that process information;
a memory interfaced with the processor and operable to store the instructions and information;
a display interfaced with the processor and operable to present the information as visual images; and
a mouse interfaced with the processor and operable to move a cursor presentation location at the display, the mouse having a scroll wheel exposed at an upper side operable to scroll visual images presented at the display, the mouse further having a push button scroll device exposed adjacent the scroll wheel and operable to command a predetermined scroll of the visual images;
wherein the push button scroll device has a first way actuation to scroll up, a second way actuation to scroll down, and a downward way actuation that commands a fast scroll up when actuated simultaneously with the first-way actuation and a fast scroll down when actuated simultaneously with the second-way actuation.

2. The information handling system of claim 1 wherein the push button scroll device further comprises:
a multidirectional switch disposed in the mouse; and
a member extending out from the multidirectional switch to accept a first input in a first direction to scroll visual images up at a predetermined speed and to accept a second input in a second direction to scroll visual images down at a predetermined speed.

3. The information handling system of claim 2 wherein the scroll predetermined speed up and down is a user selectable preference applied at the mouse.

4. The information handling system of claim 2 wherein the scroll speed up and down is a user selectable preference applied at the processor.

5. The information handling system of claim 2 wherein:
the multidirectional switch comprises at least a three way switch including a push down switch;
simultaneous push down and push in the first direction commands a fast scroll up; and
simultaneous push down and push in the second direction commands a fast scroll down.

6. The information handling system of claim 2 wherein:
the multidirectional switch is a five-way switch; and the member constrains movement to actuate only a front way, rear way and downward way of the five-way switch.

7. The information handling system of claim 3 wherein the selectable preference includes at least a page up and page down preference.

8. The information handling system of claim 3 wherein the selectable preference includes at least an incremental line up and down preference.

9. The information handling system of claim 3 wherein the selectable preference includes at least a fast scroll relative to the scroll of the scroll wheel.

10. A method for scrolling visual content presented at an information handling system display, the method comprising:
  exposing an interface of a multidirectional switch at a mouse upper surface proximate a scroll wheel;
  commanding a scroll down of the visual content in response to a first-way actuation of the multidirectional switch;
  commanding a scroll up of the visual content in response to a second-way actuation of the multidirectional switch;
  commanding a fast scroll down of the visual content in response to a simultaneous first way actuation and downward actuation of the multidirectional switch; and
  commanding a fast scroll up of the visual content in response to a simultaneous second way actuation and downward actuation of the multidirectional switch.

11. The method of claim 10 wherein the multidirectional switch is a five-way switch, the method further comprising constraining the five-way switch to actuate only in first way, second way and downward way.

12. The method of claim 10 further comprising:
  scrolling visual images in response to rotation of the scroll wheel at a first speed; and
  scrolling visual images in response to the first way actuation and second way actuation at a second speed different than the first speed.

13. The method of claim 12 wherein the second speed is an incremental line scroll slower than the first speed.

14. The method of claim 12 wherein the second speed is a page increment speed faster than the first speed.

15. The method of claim 12 further comprising setting the second speed as a user preference stored in the mouse.

16. A mouse comprising:
  a body shaped to accept movement by an end user hand;
  a scroll wheel exposed at an upper surface of the body and operable to command a scroll of visual images at a first scroll speed; and
  a multidirectional switch accessible by a member exposed at the upper surface adjacent the scroll wheel and operable to command the scroll of visual images at a second scroll speed, wherein:
  a first-way actuation commands a scroll up of the visual information at the second scroll speed;
  a second-way actuation commands a scroll down of the visual information at the second scroll speed; and
  a downward way actuation commands a fast scroll up when actuated simultaneously with the first-way actuation and a fast scroll down when actuated simultaneously with a second-way actuation.

17. The mouse of claim 16 wherein the multidirectional switch is a five-way switch constrained to actuate only the first way, the second way and the downward way.

* * * * *